US012586107B2

(12) United States Patent
Gaskill et al.

(10) Patent No.: US 12,586,107 B2
(45) Date of Patent: **\*Mar. 24, 2026**

(54) DOCUMENT OPTICAL CHARACTER RECOGNITION

(71) Applicant: eBay Inc., San Jose, CA (US)

(72) Inventors: Braddock Gaskill, South Pasadena, CA (US); Robinson Piramuthu, Oakland, CA (US)

(73) Assignee: EBAY INC., San Jose, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/392,629

(22) Filed: Dec. 21, 2023

(65) Prior Publication Data

US 2024/0127302 A1 Apr. 18, 2024

Related U.S. Application Data

(63) Continuation of application No. 16/058,259, filed on Aug. 8, 2018, now Pat. No. 11,893,611, which is a
(Continued)

(51) Int. Cl.
*G06K 9/00* (2022.01)
*G06K 9/32* (2006.01)
(Continued)

(52) U.S. Cl.
CPC ......... *G06Q 30/0601* (2013.01); *G06V 20/62* (2022.01); *G06V 30/155* (2022.01);
(Continued)

(58) Field of Classification Search
CPC ......... G01N 2030/628; G06Q 30/0601; G06V 10/267; G06V 10/273; G06V 10/46;
(Continued)

(56) References Cited

U.S. PATENT DOCUMENTS

| | | | | |
|---|---|---|---|---|
| 10,229,314 | B1 * | 3/2019 | Mitchell | G06Q 20/047 |
| 2010/0329555 | A1 * | 12/2010 | Chapman | G06V 30/127 |
| | | | | 382/167 |

(Continued)

FOREIGN PATENT DOCUMENTS

| | | | | |
|---|---|---|---|---|
| KR | 102601357 | B1 | 11/2023 | |
| WO | WO-2009137073 | A1 * | 11/2009 | G06V 30/1463 |

OTHER PUBLICATIONS

"U.S. Appl. No. 16/058,259, Examiner Interview Summary mailed Apr. 6, 2023", 2 pgs.

(Continued)

*Primary Examiner* — Liton Miah
(74) *Attorney, Agent, or Firm* — SCHWEGMAN LUNDBERG & WOESSNER, P.A.

(57) ABSTRACT

Vehicles and other items often have corresponding documentation, such as registration cards, that includes a significant amount of informative textual information that can be used in identifying the item. Traditional OCR may be unsuccessful when dealing with non-cooperative images. Accordingly, features such as dewarping, text alignment, and line identification and removal may aid in OCR of non-cooperative images. Dewarping involves determining curvature of a document depicted in an image and processing the image to dewarp the image of the document to make it more accurately conform to the ideal of a cooperative image. Text alignment involves determining an actual alignment of depicted text, even when the depicted text is not aligned with depicted visual cues. Line identification and removal involves identifying portions of the image that depict lines and removing those lines prior to OCR processing of the image.

20 Claims, 14 Drawing Sheets

Related U.S. Application Data continuation of application No. 15/164,594, filed on May 25, 2016, now Pat. No. 10,068,132.

(51) Int. Cl.

| | |
|---|---|
| *G06K 9/34* | (2006.01) |
| *G06K 9/46* | (2006.01) |
| *G06K 9/48* | (2006.01) |
| *G06Q 30/06* | (2023.01) |
| *G06Q 30/0601* | (2023.01) |
| *G06V 20/62* | (2022.01) |
| *G06V 30/148* | (2022.01) |
| *G06V 30/18* | (2022.01) |
| *G06V 30/412* | (2022.01) |
| *G06V 30/413* | (2022.01) |
| *G06V 30/10* | (2022.01) |

(52) U.S. Cl.
CPC ...... *G06V 30/18105* (2022.01); *G06V 30/412* (2022.01); *G06V 30/413* (2022.01); *G06V 20/625* (2022.01); *G06V 30/10* (2022.01); *G06V 2201/13* (2022.01)

(58) Field of Classification Search
CPC ...... G06V 10/56; G06V 20/62; G06V 20/625; G06V 2201/13; G06V 30/10; G06V 30/155; G06V 30/18105; G06V 30/412; G06V 30/413
See application file for complete search history.

(56) References Cited

U.S. PATENT DOCUMENTS

| | | | | |
|---|---|---|---|---|
| 2013/0016128 A1* | 1/2013 | Bhatt | .................... | G06T 11/60 |
| | | | | 345/661 |
| 2013/0022231 A1* | 1/2013 | Nepomniachtchi | .. | G06Q 20/387 |
| | | | | 382/229 |
| 2017/0344857 A1* | 11/2017 | Martin | .................. | G06F 18/24 |

OTHER PUBLICATIONS

"U.S. Appl. No. 16/058,259, Examiner Interview Summary mailed Sep. 12, 2023", 2 pgs.
"U.S. Appl. No. 16/058,259, Examiner Interview Summary mailed Nov. 2, 2022", 2 pgs.
"U.S. Appl. No. 16/058,259, Final Office Action mailed Feb. 7, 2023", 13 pgs.
"U.S. Appl. No. 16/058,259, Non Final Office Action mailed Jun. 8, 2023", 14 pgs.
"U.S. Appl. No. 16/058,259, Non Final Office Action mailed Aug. 30, 2022", 11 pgs.
"U.S. Appl. No. 16/058,259, Notice of Allowance mailed Oct. 26, 2023", 9 pgs.
"U.S. Appl. No. 16/058,259, Preliminary Amendment filed Oct. 21, 2020", 6 pgs.
"U.S. Appl. No. 16/058,259, Preliminary Amendment filed Nov. 27, 2018", 6 pg.

\* cited by examiner

130

IDENTIFICATION SERVER

210
COMMUNICATION MODULE

250
DEWARPING MODULE

220
TEXT IDENTIFICATION MODULE

260
USER INTERFACE MODULE

230
LINE REMOVAL MODULE

270
LISTING MODULE

240
PAGE DETECTION MODULE

280
STORAGE MODULE

910

920

SJNFBNJ1OU1385803

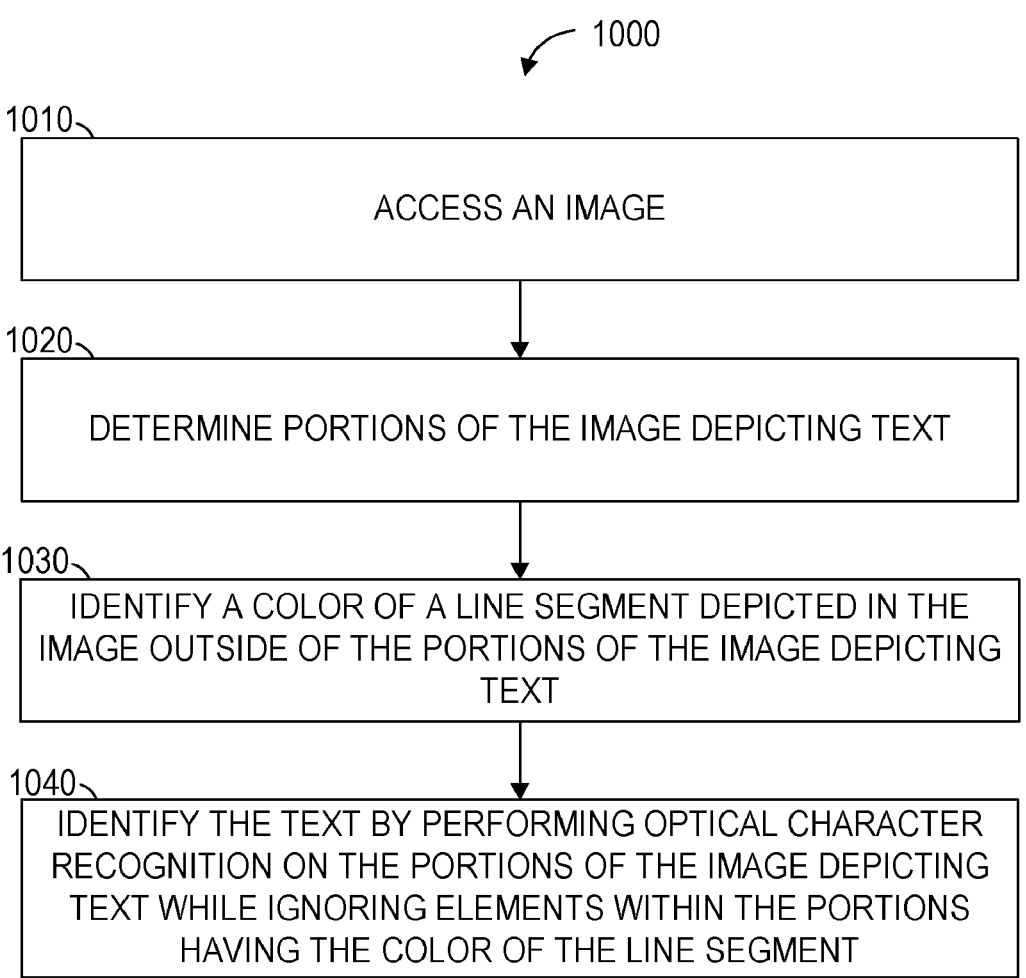

1000

1010
ACCESS AN IMAGE

1020
DETERMINE PORTIONS OF THE IMAGE DEPICTING TEXT

1030
IDENTIFY A COLOR OF A LINE SEGMENT DEPICTED IN THE IMAGE OUTSIDE OF THE PORTIONS OF THE IMAGE DEPICTING TEXT

1040
IDENTIFY THE TEXT BY PERFORMING OPTICAL CHARACTER RECOGNITION ON THE PORTIONS OF THE IMAGE DEPICTING TEXT WHILE IGNORING ELEMENTS WITHIN THE PORTIONS HAVING THE COLOR OF THE LINE SEGMENT

1210 — RECEIVE AN IMAGE FROM A USER

1220 — USING OPTICAL CHARACTER RECOGNITION, EXTRACT AN IDENTIFIER OF A VEHICLE FROM THE IMAGE

1230 — RETRIEVE ADDITIONAL INFORMATION REGARDING THE VEHICLE FROM A DATABASE

1240 — GENERATE A FOR-SALE LISTING FOR THE VEHICLE USING AT LEAST SOME OF THE ADDITIONAL INFORMATION

1300

1400

DOCUMENT OPTICAL CHARACTER RECOGNITION

CLAIM OF PRIORITY

This application is a continuation of U.S. application Ser. No. 16/058,259, filed Aug. 8, 2018, which is a continuation of U.S. application Ser. No. 15/164,594, filed May 25, 2016, each of which is hereby incorporated by reference in its entirety.

TECHNICAL FIELD

The subject matter disclosed herein generally relates to optical character recognition. Specifically, the present disclosure addresses systems and methods related to optical character recognition of text in images of documents describing items.

BACKGROUND

Optical character recognition (OCR) is used to identify characters in images of text when the text on the document is aligned with the edges of the image and the image quality is high. Images having proper lighting, wherein the document is directly facing and property aligned with the camera, and wherein the image contains no objects other than the document are termed "cooperative." Images lacking one or more of these features are termed "non-cooperative." For example, an image having poor lighting or that includes occlusions that block one or more portions of the document is non-cooperative. Traditional OCR may be unsuccessful when dealing with non-cooperative images.

BRIEF DESCRIPTION OF THE DRAWINGS

Some embodiments are illustrated, by way of example and not limitation, in the figures of the accompanying drawings.

FIG. 10 is a flowchart illustrating operations of a device in performing a process of identifying text depicted in an image, according to some example embodiments.

DETAILED DESCRIPTION

Example methods and systems are directed to identification of items from text depicted in images. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Vehicles and other items often have corresponding documentation, such as registration cards, that include a significant amount of informative textual information that can be used in identifying the item. Traditional optical character recognition (OCR) can be used when the text on the document is aligned with the edges of the image and the image quality is high. Traditional OCR may be unsuccessful when dealing with non-cooperative images. Accordingly, features such as dewarping, text alignment, and line identification and removal may aid in OCR of non-cooperative images.

Dewarping involves determining curvature of a document depicted in an image and processing the image to dewarp the image of the document to make it more accurately conform to the ideal of a cooperative image. In some example embodiments, dewarping is achieved by identifying lines that are straight on the original document but curved in the image. A transformation that straightens the lines in the image is applied, causing the lines and other portions of the image to be dewarped.

Text alignment involves determining an actual alignment of depicted text, even when the depicted text is not aligned with depicted visual cues (e.g., lines or boxes on a form). In some example embodiments, the alignment of rows of text is determined by virtually superimposing grids of lines over the text with different positions and spacings. The position and spacing of the grid that overlaps the least with identified locations of text may be used as a basis for text alignment.

Line identification and removal involves identifying portions of the image that depict lines and removing those lines prior to OCR processing of the image. In some example embodiments, line identification involves detecting a color difference between lines and text by identifying respective portions of the image and taking an average of the color of pixels in those respective portions. The detected line color can be used to identify pixels within the portions of the image that represent text. The identified pixels may be removed or ignored when performing OCR on the text portions.

Figure 1:
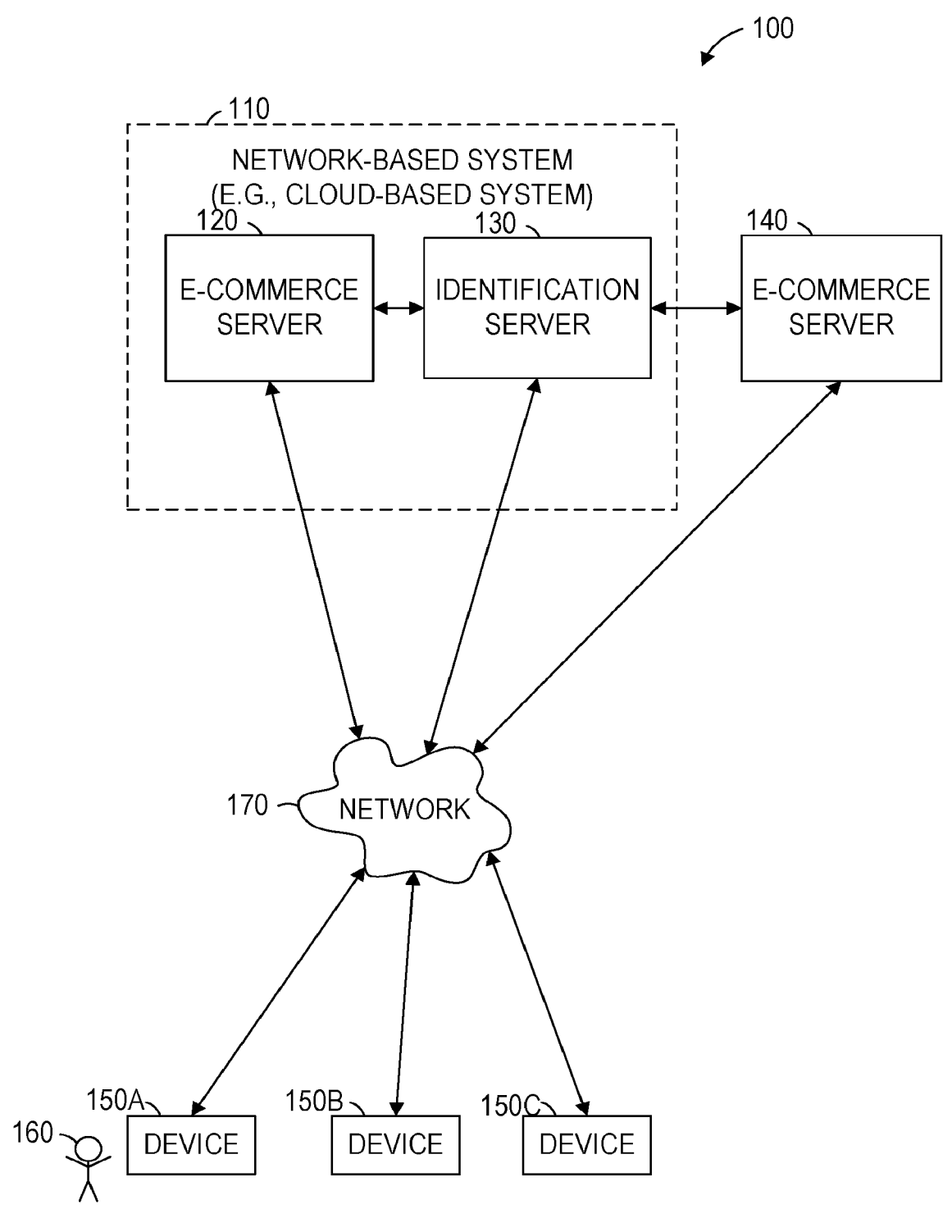
FIG. 1 is a network diagram illustrating a network environment suitable for vehicle registration optical character recognition, according to some example embodiments.

FIG. 1 is a network diagram illustrating a network environment 100 suitable for vehicle registration OCR, according to some example embodiments. The network environment 100 includes e-commerce servers 120 and 140, an identification server 130, and devices 150A, 150B, and 150C, all communicatively coupled to each other via a network 170. The devices 150A, 150B, and 150C may be collectively referred to as "devices 150," or generically referred to as a "device 150." The e-commerce server 120 and the identification server 130 may be part of a network-based system 110. Alternatively, the devices 150 may connect to the identification server 130 directly or over a local network distinct from the network 170 used to connect to the e-commerce server 120 or 140. The e-commerce servers 120 and 140, the identification server 130, and the devices 150 may each be implemented in a computer system, in whole or in part, as described below with respect to FIGS. 13-14.

The e-commerce servers 120 and 140 provide an electronic commerce application to other machines (e.g., the devices 150) via the network 170. The e-commerce servers 120 and 140 may also be connected directly to, or integrated with, the identification server 130. In some example embodiments, one e-commerce server 120 and the identification server 130 are part of a network-based system 110, while other e-commerce servers (e.g., the e-commerce server 140) are separate from the network-based system 110. The electronic commerce application may provide a way for users to buy and sell items directly to each other, to buy from and sell to the electronic commerce application provider, or both.

Also shown in FIG. 1 is a user 160. The user 160 may be a human user (e.g., a human being), a machine user (e.g., a computer configured by a software program to interact with the devices 150 and the identification server 130), or any suitable combination thereof (e.g., a human assisted by a machine or a machine supervised by a human). The user 160 is not part of the network environment 100, but is associated with the devices 150 and may be a user of the devices 150. For example, the device 150 may be a sensor, a desktop computer, a vehicle computer, a tablet computer, a navigational device, a portable media device, or a smart phone belonging to the user 160.

In some example embodiments, the identification server 130 receives data regarding an item owned by a user. For example, a camera attached to the device 150A can take an image of a vehicle registration form for a vehicle that the user 160 wishes to sell, and can transmit the image over the network 170 to the identification server 130. The identification server 130 identifies the vehicle based on the image. Information about the identified vehicle can be sent to the e-commerce server 120 or 140, to the device 150A, or any combination thereof. The information can be used by the e-commerce server 120 or 140 to aid in generating a listing of the vehicle for sale. Similarly, the image may be of a document containing information regarding an item of interest to the user 160, and the information can be used by the e-commerce server 120 or 140 to aid in selecting listings of items to show to the user 160.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 13-14. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The network 170 may be any network that enables communication between or among machines, databases, and devices (e.g., the identification server 130 and the devices 150). Accordingly, the network 170 may be a wired network, a wireless network (e.g., a mobile or cellular network), or any suitable combination thereof. The network 170 may include one or more portions that constitute a private network, a public network (e.g., the Internet), or any suitable combination thereof.

Figure 2:
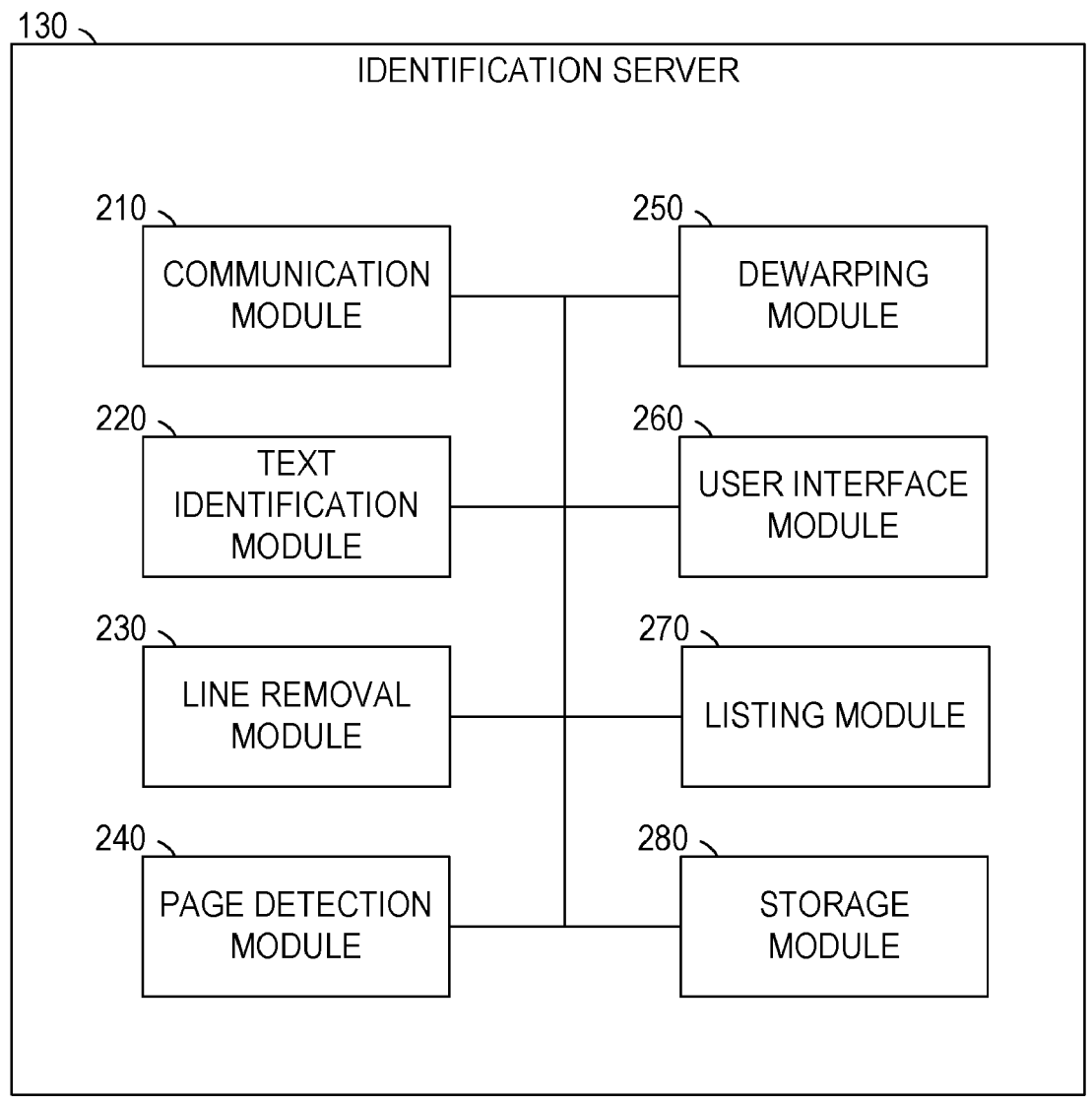
FIG. 2 is a block diagram illustrating components of an identification server suitable for vehicle registration optical character recognition, according to some example embodiments.

FIG. 2 is a block diagram illustrating components of the identification server 130, according to some example embodiments. The identification server 130 is shown as including a communication module 210, a text identification module 220, a line removal module 230, a page detection module 240, a dewarping module 250, a user interface (UI) module 260, a listing module 270, and a storage module 280, all configured to communicate with each other (e.g., via a bus, shared memory, or a switch). Any one or more of the modules described herein may be implemented using hardware (e.g., a processor of a machine). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 is configured to send and receive data. For example, the communication module 210 may receive image data over the network 170 and send the received data to the text identification module 220, the line removal module 230, and the dewarping module 250. The image data may be a two-dimensional image, a frame from a continuous video stream, a three-dimensional image, a depth image, an infrared image, a binocular image, or any suitable combination thereof. For example, an image may be received from a camera.

The text identification module 220 is configured to generate text identifying an item based on a document depicted in an input image. For example, the input image may be processed by the dewarping module 250 and the line removal module 230 to improve the quality of the image for processing by the text identification module 220. The text identification module 220 processes the modified image to identify text contained in the image. For example, a vehicle identification number (VIN) may be extracted from the image.

The line removal module 230 is configured to identify and remove lines from within text regions of the image. Without line removal, lines that are preprinted on a form are more likely to interfere with OCR. For example, the letter "F" may be interpreted as a letter "E" if the alignment of the text with the lines is such that a horizontal line runs through the bottom of the text. Such an error is less likely to occur if line removal is performed prior to OCR.

The page detection module 240 is configured to identify pages within the image. For example, a multi-page document may be photographed by a user with a separate image for each page or with multiple pages in a single image.

Through the use of the page detection module 240, the portions of the image corresponding to different pages are identified, allowing the identification server 130 to process all pages of the document appearing in the image.

The dewarping module 250 is configured to determine warping of the document depicted in the image and apply one or more transformations to corresponding portions of the image to counteract the warping. Without dewarping, characters that are warped are less likely to be correctly recognized. Additionally, without dewarping, regions expected to contain particular character strings are less likely to be correctly determined. For example, if a portion of the image is warped, the first character in a string may be aligned with the edges of the image, while the last character is at a 30 degree angle and offset vertically by an amount greater than the character height. Accordingly, without dewarping, a rectangular area sized and oriented based on the location of the first character in the string would not contain the last character. After dewarping, regions associated with particular strings are more likely to be correctly sized and aligned.

The user interface module 260 is configured to cause a user interface to be presented on one or more of the devices 150A-150C. For example, the user interface module 260 may be implemented by a web server providing HTML, files to a device 150 via the network 170. The user interface may present the image received by the communication module 210, data retrieved from the storage module 280 regarding an item identified from a document depicted in the image, an item listing generated or selected by the listing module 270, or any suitable combination thereof.

The listing module 270 is configured to generate an item listing for an item identified from text generated by the text identification module 220. For example, after a user has uploaded an image depicting a vehicle registration and the vehicle is successfully identified, the listing module 270 may create an item listing including an image of the model of the vehicle from an item catalog, a description of the vehicle from the item catalog, or any suitable combination thereof. The user may be prompted to confirm or modify the generated listing, or the generated listing may be published automatically in response to the identification of the depicted item. The listing may be sent to the e-commerce server 120 or 140 via the communication module 210. In some example embodiments, the listing module 270 is implemented in the e-commerce server 120 or 140 and the listing is generated in response to an identifier for the item being sent from the identification server 130 to the e-commerce server 120 or 140.

The storage module 280 is configured to store and retrieve data generated and used by the text identification module 220, the line removal module 230, the page detection module 240, the dewarping module 250, the user interface module 260, and the listing module 270. For example, a classifier used by the text identification module 220 can be stored by the storage module 280. Information regarding identification of an item depicted in an image can also be stored by the storage module 280. The e-commerce server 120 or 140 can request identification of an item described in a document depicted in image (e.g., by providing the image, an image identifier, or both), which can be retrieved from storage by the storage module 280 and sent over the network 170 using the communication module 210.

Figure 3:
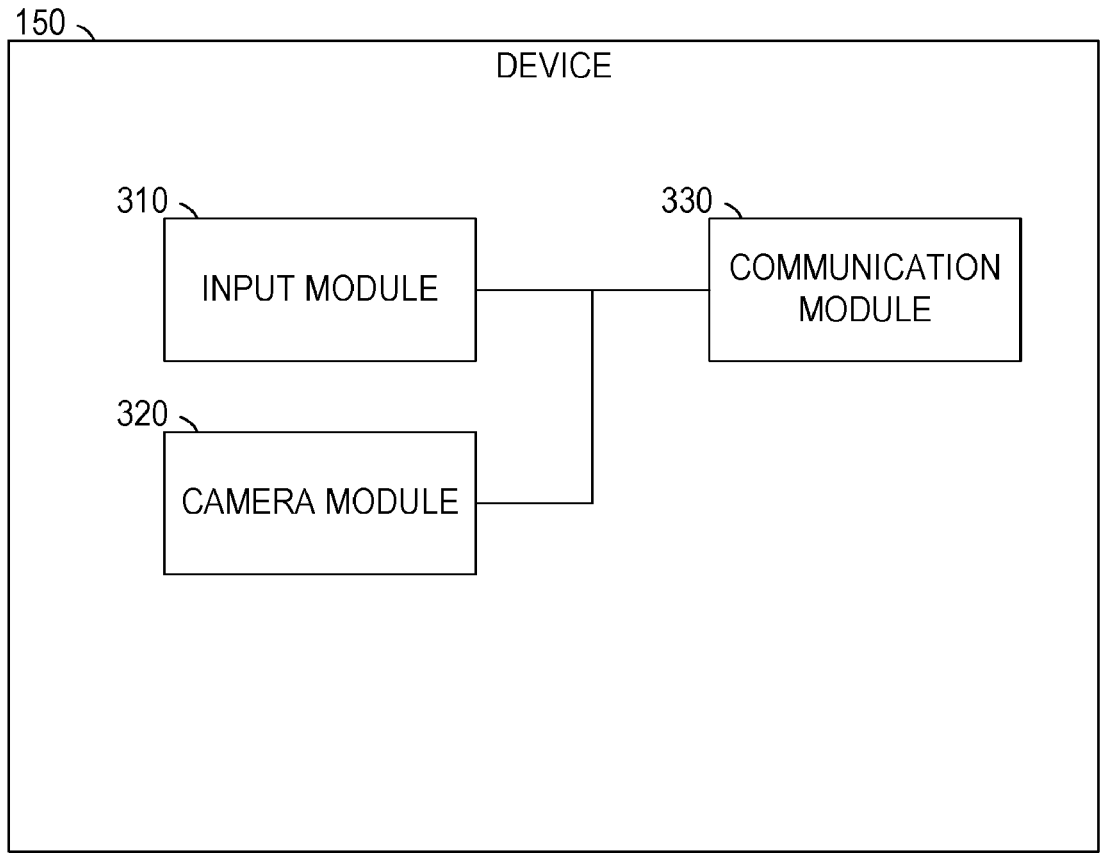
FIG. 3 is a block diagram illustrating components of a device suitable for capturing images of documents and communicating with a server configured to identify items based on the images, according to some example embodiments.

FIG. 3 is a block diagram illustrating components of the device 150, according to some example embodiments. The device 150 is shown as including an input module 310, a camera module 320, and a communication module 330, all configured to communicate with each other (e.g., via a bus, shared memory, or a switch). Any one or more of the modules described herein may be implemented using hardware (e.g., a processor of a machine). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The input module 310 is configured to receive input from a user via a user interface. For example, the user may enter their username and password into the input module 310, configure a camera, select an image to use as a basis for a listing or an item search, or any suitable combination thereof.

The camera module 320 is configured to capture image data. For example, an image may be received from a camera, a depth image may be received from an infrared camera, a pair of images may be received from a binocular camera, and so on.

The communication module 330 is configured to communicate data received by the input module 310 or the camera module 320 to the identification server 130, the e-commerce server 120, or the e-commerce server 140. For example, the input module 310 may receive a selection of an image taken with the camera module 320 and an indication that the image depicts a document for an item that the user (e.g., user 160) wishes to sell. The communication module 330 may transmit the image and the indication to the e-commerce server 120. The e-commerce server 120 may send the image to the identification server 130 to request identification of an item based on the document depicted in the image, generate a listing template based on the item, and cause the listing template to be presented to the user via the communication module 330 and the input module 310.

Figure 4:
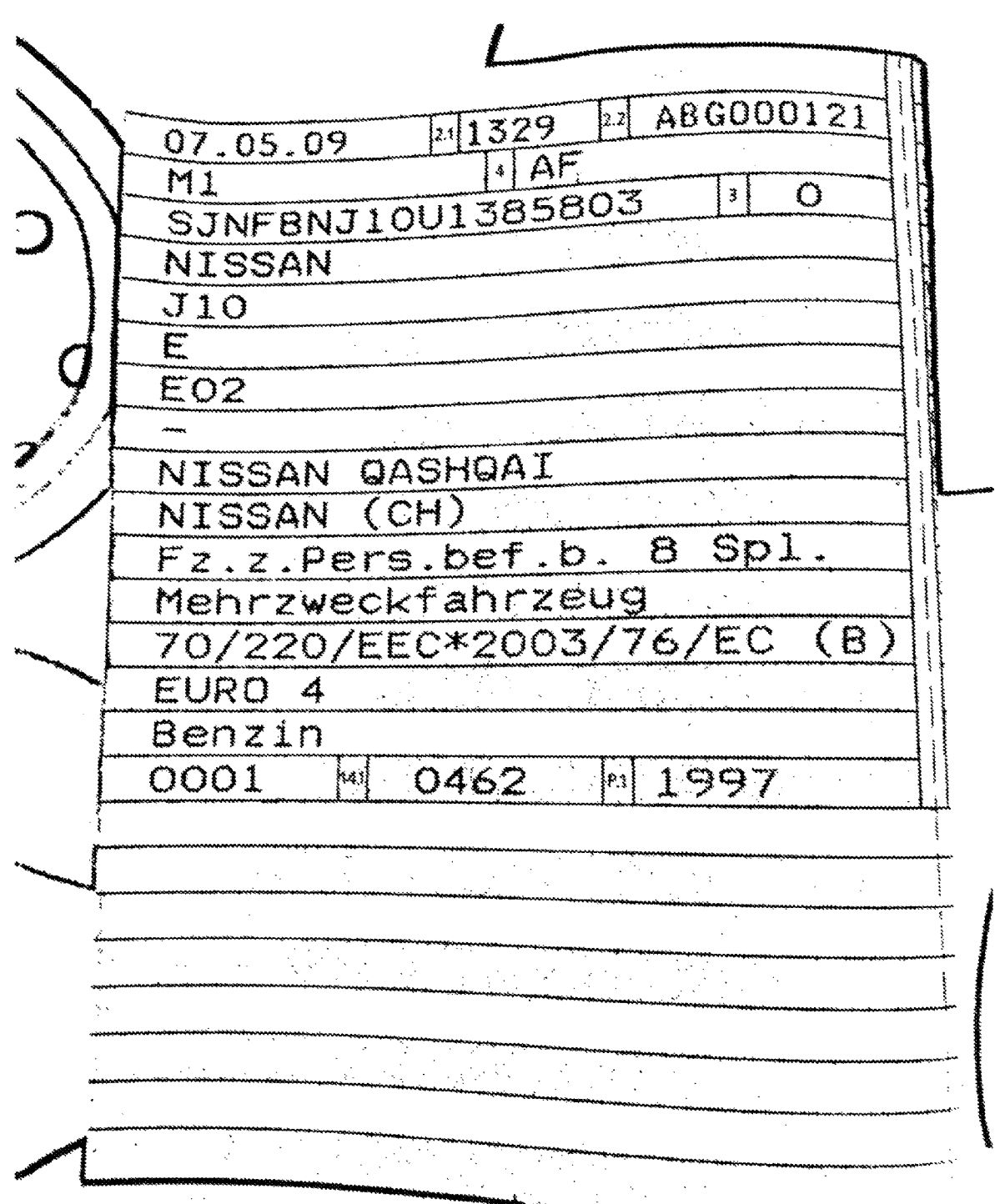
FIG. 4 illustrates an example binarized image of a document, according to some example embodiments.

FIG. 4 illustrates an example binarized image of a document, according to some example embodiments. The original input image of the document, not shown, may have been in color. For example, the input image may have been 600×800 pixels, with each pixel represented by a 24-bit red-green-blue (RGB) value. To obtain the binarized image, each pixel is processed and replaced with either black or white. Binarization may be performed using a number of different algorithms. For example, the RGB values may be summed and compared to a threshold, with values below (darker than) the threshold being converted to black and values above the threshold being converted to white. As another example, a single channel (e.g., the green channel) may be compared to a threshold. As yet another example, the channels may be weighted prior to summing.

Figure 5:
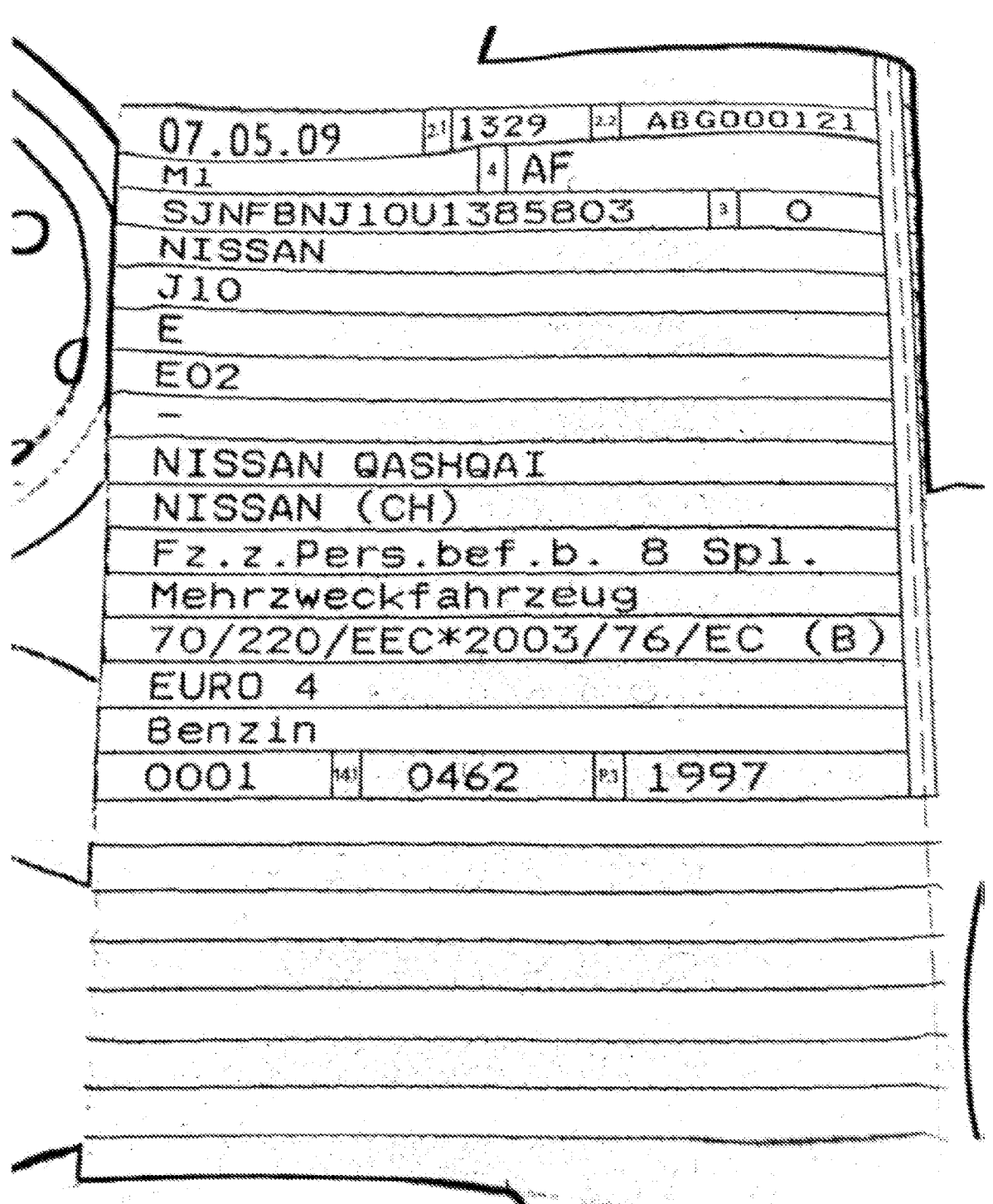
FIG. 5 illustrates an example dewarped image of a document, according to some example embodiments.

FIG. 5 illustrates an example dewarped image of the document of FIG. 4. Compared to FIG. 4, the horizontal lines and associated text of FIG. 5 are straighter, due to the dewarping of the image. As a result, OCR performed on regions aligned with the lines of the image of FIG. 5 may be more successful than OCR performed on regions aligned with the lines of the image of FIG. 4. The process of dewarping is described with respect to FIG. 11, below.

Figure 6:
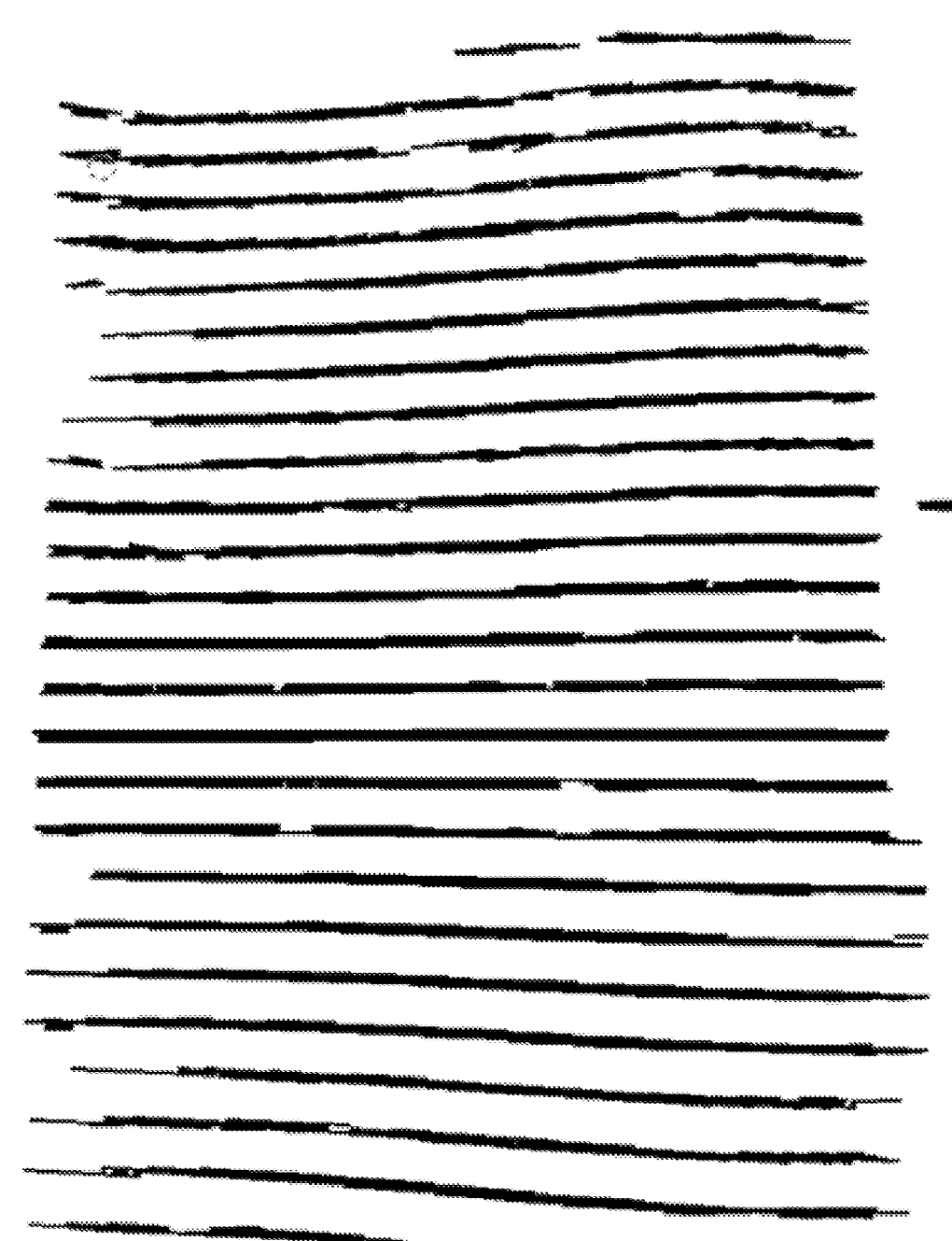
FIG. 6 illustrates an example of detected lines in an image, according to some example embodiments.

FIG. 6 illustrates an example of detected lines in the image of FIG. 4. In some example embodiments, line detection is a step performed in the process of dewarping an image, described in more detail with respect to FIG. 11, below. Line detection may be performed by identifying areas of high horizontal energy. Additionally or alternatively, line detection may be performed by applying a binary classifier (e.g., a support vector machine or recurrent neural network) trained to classify each element of the image as either part of a line or not part of a line.

Figure 7:
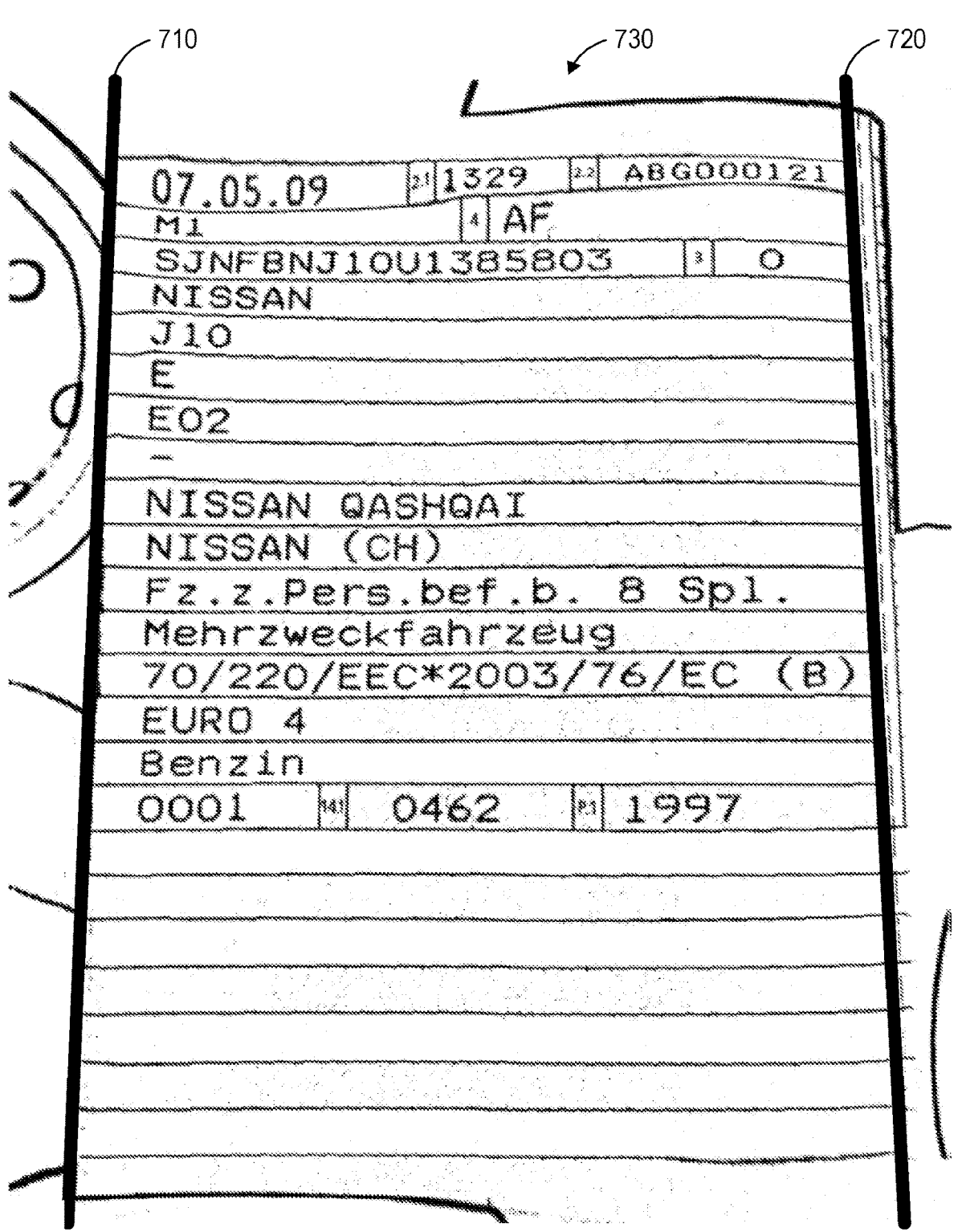
FIG. 7 illustrates an example of detected page boundaries in an image, according to some example embodiments.

FIG. 7 illustrates an example of detected page boundaries 710 and 720 in the image of FIG. 5, according to some example embodiments. Based on the detection of the page boundaries 710 and 720, a page region 730 is identified. The page boundaries 710 and 720 may be detected based on the primarily vertical lines at the positions of the page boundaries 710 and 720, based on the endpoints of the primarily horizontal lines of the page region 730, or any suitable combination thereof. In some example embodiments, an edge of the image is used as a page boundary. Alternatively or additionally, multiple page regions may be identified within the image based on page boundary detection. For example, a document that exists physically in three parts folded together may be unfolded and all three pages scanned together in a single image. Accordingly, page detection allows the image to be properly divided so that each page can be processed correctly.

Figure 8:
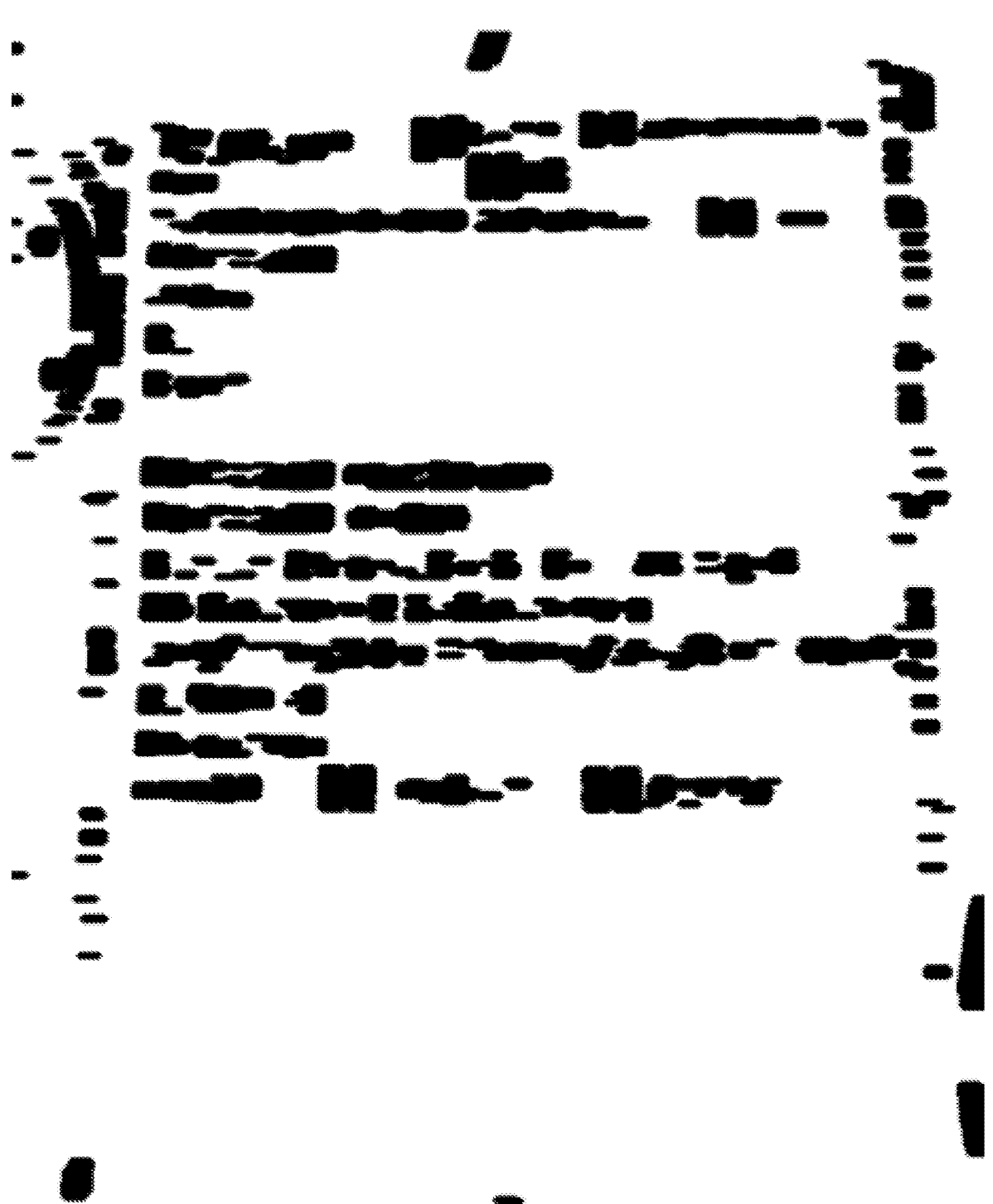
FIG. 8 illustrates an example of detected text locations in an image, according to some example embodiments.

FIG. 8 illustrates an example of detected text locations in the image of FIG. 5, according to some example embodiments. For example, an edge detector (e.g., a Sobel filter) may be used to locate regions likely to contain text based on vertical energy. Vertical energy is a measure of similarity between vertically offset adjacent pixels. Thus, perfectly vertical lines of identical color have maximal vertical energy. Since many characters contain vertical elements, text regions tend to have higher vertical energy than non-text regions. As can be seen by comparison between FIG. 8 and FIG. 5, not every detected text location actually corresponds to a location of text. By further comparison of FIG. 8 with FIG. 7, it can be seen that most of the incorrectly identified text locations lie outside of the page region 730, and thus can be ignored when the page region 730 is being processed.

Figure 9:
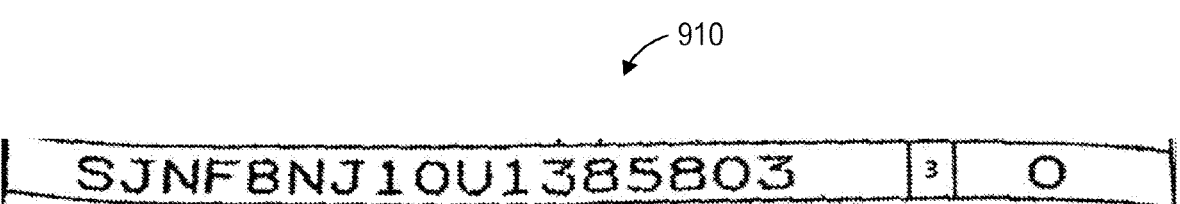
FIG. 9 illustrates an example of a detected text field in an image, according to some example embodiments.

FIG. 9 illustrates an example of a detected text field in an image, according to some example embodiments. An image fragment 910 is extracted from the image of FIG. 5. As can be seen in FIG. 9, the text depicted in the image fragment 910 is substantially aligned with the image boundaries, showing that the dewarping of the image of FIG. 4 was successful. Text 920 is extracted from the image fragment 910 for OCR. For example, the image fragment 910 may contain three pieces of information, divided by vertical lines. Each piece of information may have a known meaning for a particular document, a particular purpose, or a particular document/purpose pair. For example, the first field on the line may be a vehicle registration number, the second field may indicate the number of owners of the vehicle, and the third field may indicate a status of the vehicle. Accordingly, the text 920 may be extracted from the first field of the portion of the image fragment 910 and OCR applied to the text 920 to determine the vehicle registration number.

FIG. 10 is a flowchart illustrating operations of a device in performing a process 1000 of identifying text depicted in an image, according to some example embodiments. The process 1000 includes operations 1010-1040. By way of example and not limitation, the operations of the process 1000 are described as being performed by the identification server 130 of FIG. 1 and the modules 210-280 of FIG. 2.

In operation 1010, the identification server 130 accesses an image. For example, the user 160 of the device 150A may take a picture of a vehicle registration card and sent it, over the network 170, to the identification server 130. The communication module 210 of the identification server 130 receives the image and provides it to the storage module 280, for storage and provision of the image to other modules.

The text identification module 220, in operation 1020, identifies portions of the image containing text. For example, as described above with respect to FIG. 8, regions of high vertical energy may be used to determine which portions of the image are likely to contain text.

In operation 1030, the line removal module 230 identifies a color of a line segment depicted in the image outside of the portions of the image identified in operation 1020 as containing text. For example, lines having high horizontal energy may be identified in the image, as shown in FIG. 6. The text areas, as shown in the example of FIG. 8, can be used as a mask, to remove portions of the detected lines. This leaves only the line portions outside of the text regions. The color of the portion of the original image identified by the line portions is determined. For example, pixel values corresponding to the portions of a line outside of the text regions can be averaged to identify an average color of the line. In some example embodiments, the color of each identified line is determined separately. In other example embodiments, the color of all lines is determined as a single value.

The color of the identified line may be different for different segments of the line. For example, consider an image of a document captured by a camera while the document was partially shaded and partially in direct sunlight. A line on the document is, to a human observer, dark green. However, in the image, the pixels depicting the part of the line that is in direct sunlight may appear light green while the pixels depicting the part of the line in the shade may appear nearly black. The full line may still be identified by its high horizontal energy, despite the color change.

In operation 1040, the text identification module 220, in conjunction with the line removal module 230, identifies the text by performing OCR on the portions of the image depicting text while ignoring elements within the portions having the color of the line segment. For example, if the text is black, the background is white, and the lines are green, some portion of the text regions will contain green pixels. In operation 1040, OCR is performed on the text regions while the green pixels are treated as though they were the background color. Accordingly, the OCR is more likely to generate correct values for the text characters compared to processes in which the lines are treated as part of the text.

The determination as to whether or not pixels are the color of the line segment may be performed by determining a difference value between the pixel and the color of the line segment. For example, if the line segment is RGB color (0, 102, 51) (dark green) and the pixel is (255, 128, 0) (orange), the difference is (255, 26, −51). The magnitude of the difference can be calculated and compared to a threshold. One magnitude calculation is the geometric distance. A sample threshold for the geometric distance is 18. For this example, the geometric distance between the dark green line segment and the orange pixel is 261, far greater than the threshold. Accordingly, this pixel would not be categorized as being part of the line segment. In some example embodiments, the classification of the pixels is performed by a support vector machine (SVM) trained to distinguish between line pixels and background pixels.

Figure 11:
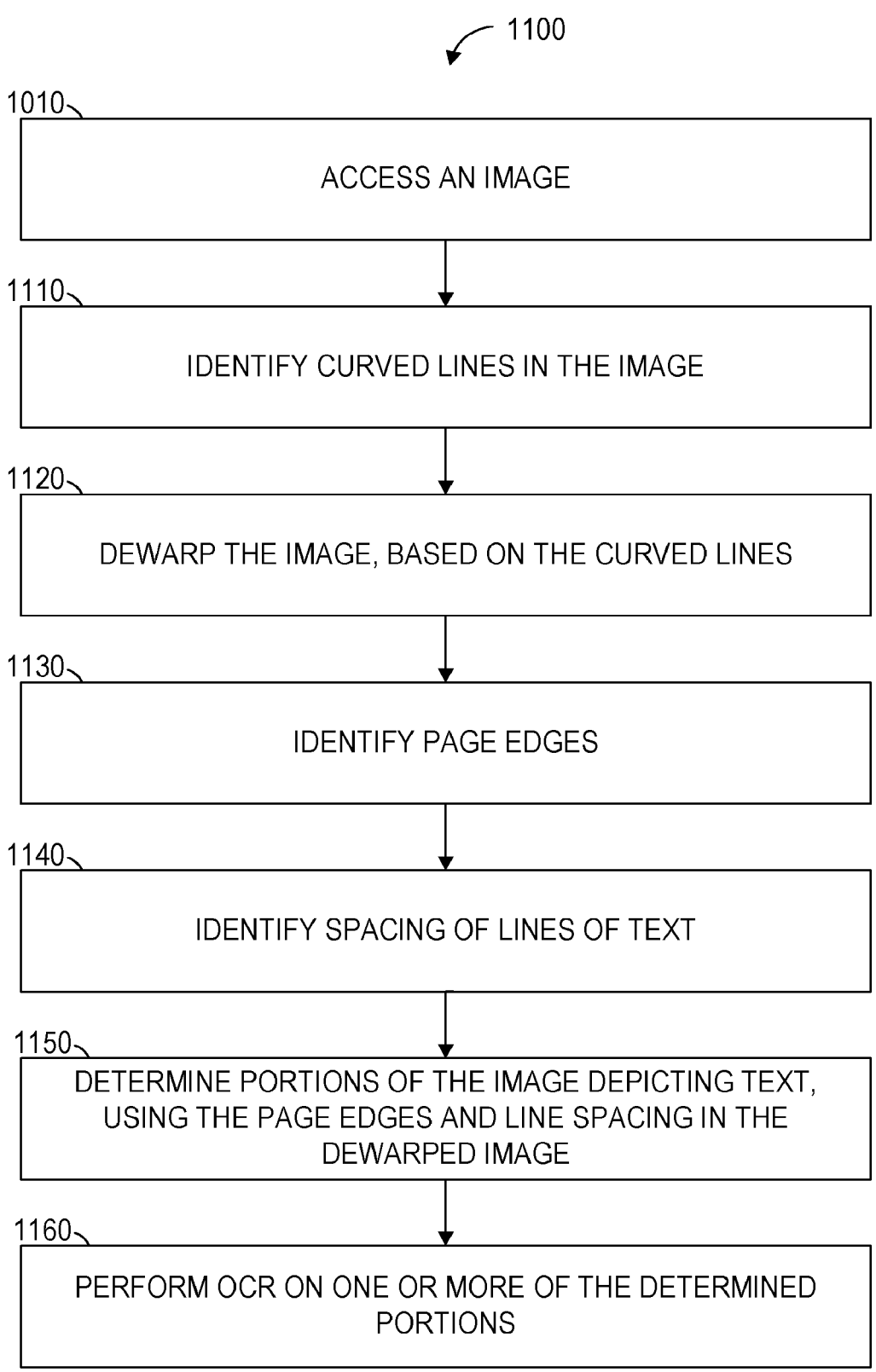
FIG. 11 is a flowchart illustrating operations of a device in performing a process of identifying text depicted in an image, according to some example embodiments.

FIG. 11 is a flowchart illustrating operations of a device in performing a process 1100 of identifying text depicted in an image, according to some example embodiments. The process 1100 includes operations 1010, 1110, 1120, 1130, 1140, 1150, and 1160. By way of example and not limitation, the operations of the process 1100 are described as being performed by the identification server 130 of FIG. 1 and the modules 210-280 of FIG. 2.

In operation 1110, the dewarping module 250 identifies curved lines in the image accessed in operation 1010. For example, lines having high horizontal energy may be identified in the image, as shown in FIG. 6.

Based on the curved lines, the dewarping module 250 dewarps the image (operation 1120). In some example embodiments, polynomial approximations (e.g., cubic polynomials) for the lines are generated and the inverse polynomials applied to straighten each line. The regions between the lines are dewarped by applying a weighted mix of the straightening function for the lines at the edge of the region. Thus, in the portion immediately adjacent to a line, the dewarping function applied is essentially the same as that applied to the line, while in the portion equidistant from the bounding lines, the dewarping function is an even blend of the dewarping functions for each of the two lines.

In operation 1130, the page detection module 240 identifies page edges in the image. Page boundaries may be detected based on the primarily vertical lines at the positions of the page boundaries, based on the endpoints of primarily horizontal lines, or any suitable combination thereof.

In operation 1140, the text identification module 220 determines a spacing of text lines in the image. In some example embodiments, the spacing of lines of text is determined by virtually superimposing grids of lines over the text with different positions and spacings. The position and spacing of the grid that overlaps the least with identified locations of text may be used as a basis for text alignment.

For example, the portion of the image depicting the page may be divided into a standard number of lines as an initial grid. As another example, operation 1020 may be used to determine text locations, which may be used to identify a number of lines of text. To illustrate this example, consider FIGS. 7 and 8. Within the page boundaries 710 and 720, one or more vertical lines can be dropped and the number of distinct intersections with areas of FIG. 8 determined. When multiple vertical lines are used, the highest number of intersections among the vertical lines or the average number of intersections among the vertical lines may be used. In some example embodiments, the initial grid is placed by setting the initial size of each row in the grid to be equal. In other example embodiments, an initial fit is made based on the positions of identified text.

From the initial grid position, the grid lines may be moved up and down, the spacing between them may be increased and decreased, and the number of lines may be increased and decreased. In some example embodiments, the lines are moved up and down in increments of 10% of the line spacing with 10 different positions tested for each line spacing; the spacing between lines is increased and decreased in increments of 10% of the original line spacing with 9 different spacings tested ranging from +40% to −40% of the original line spacing; or both.

In operation 1150, the text identification module 220 determines the portions of the dewarped image that depict text, using the page edges and line spacing. In some example embodiments, a database of known forms is accessed and the image is used to determine a best-matching form. The best-matching form is used as a template to identify the location of text in the image and its corresponding meaning. Information used to find the matching form may include an aspect ratio of the page, a number of lines, a line spacing to page height ratio, a watermark, or any suitable combination thereof.

In operation 1160, the text identification module 220 performs OCR on one or more of the determined portions that depict text. For example, the identified form may contain a vehicle registration number in a certain field, prompting the text identification module 220 to perform OCR on that field in order to extract the vehicle registration number. OCR may be performed using a trained recurrent neural network (RNN) such as OCRopus. In some example embodiments, the RNN is trained on a general corpus of English literature. In other example embodiments, the RNN is trained using only capital letters and numbers, a particular font, or other known limitations on valid characters for the particular documents being processed.

As an example of another application of the process 1100, one or more identification documents (e.g., passports, driver's licenses, or school identification cards) may be depicted in the image. Accordingly, in operations 1010, 1110, 1120, 1130, and 1140, the image is accessed, dewarped, and analyzed to determine page layout and line spacing. In operation 1150, the particular document is identified based on the image analysis. In operation 1160, OCR is performed on particular portions of the image, based on the identified document. For example, the particular state of the driver's license may be determined and the location of the driver's license number identified.

In some example embodiments, parts or all of the process 1100 is performed on the device 150. For example, the accessing of the image in operation 1010 may be performed in real time, while the user is positioning the camera to capture an image. The operations 1130, 1140, and 1150 may also be performed in real time, causing display of an overlay of page edges, line spacing, text portion, or any suitable combination thereof. Accordingly, the user is able to adjust the orientation of the camera, distance between the camera and the document, lighting, or any suitable combination thereof prior to submitting a captured image to the identification server 130.

Figure 12:
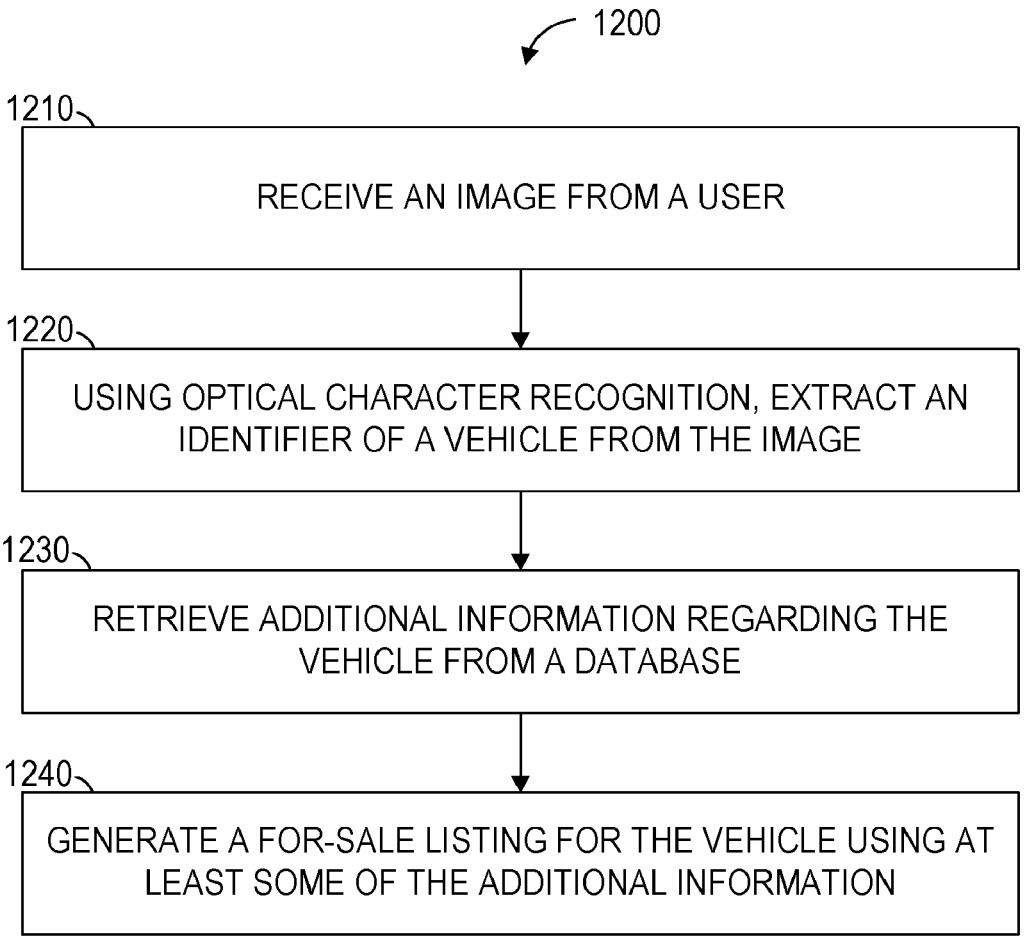
FIG. 12 is a flowchart illustrating operations of a device in performing a process of generating a for-sale listing for an item identified from text depicted in an image, according to some example embodiments.

FIG. 12 is a flowchart illustrating operations of a device in performing a process 1200 of generating a for-sale listing for an item identified from text depicted in an image, according to some example embodiments. The process 1200 includes operations 1210-1240. By way of example and not limitation, the operations of the process 1200 are described as being performed by the identification server 130 of FIG. 1 and the modules 210-280 of FIG. 2.

In operation 1210, the identification server 130 receives an image from a user. For example, the user 160 of the device 150A may take a picture of a vehicle registration card and sent it, over the network 170, to the identification server 130. The communication module 210 of the identification server 130 receives the image and provides it to the storage module 280, for storage and provision of the image to other modules.

The text identification module 220, in operation 1220, uses OCR to extract an identifier of a vehicle from the image. For example, the process 1000 and the process 1100 may be used to determine the portion of the image depicting the identifier and to recognize the text of the identifier.

In operation 1230, the listing module 270 accesses, via the storage module 280, a database of vehicle information to retrieve additional information about the identified vehicle. For example, the database may contain the make and model of the vehicle, the year it was built, the number of owners it has had, the type of engine, or any suitable combination thereof.

In operation 1240, the listing module 270 generates a for-sale listing for the vehicle using at least one item of the additional information. For example, a listing on the e-commerce server 120 or 140 may be created that includes a stock photo for the make, model, and year of the vehicle.

One or more of the methodologies described herein may obviate a need for certain efforts or resources that otherwise would be involved in recognizing text in images of documents or creating item listings for items identified in imaged documents. Efforts expended by a user in identifying a vehicle, entering data for a vehicle, or generating an item listing may also be reduced by one or more of the methodologies described herein. For example, automatic generation of a listing of a vehicle for sale saves time for the listing user and indirectly saves processor use and power consumption by avoiding time-consuming data entry and transmission. Computing resources used by one or more machines, databases, or devices (e.g., within a network environment) may similarly be reduced. Examples of such computing resources include processor cycles, network traffic, memory usage, data storage capacity, power consumption, and cooling capacity.

Software Architecture

Figure 13:
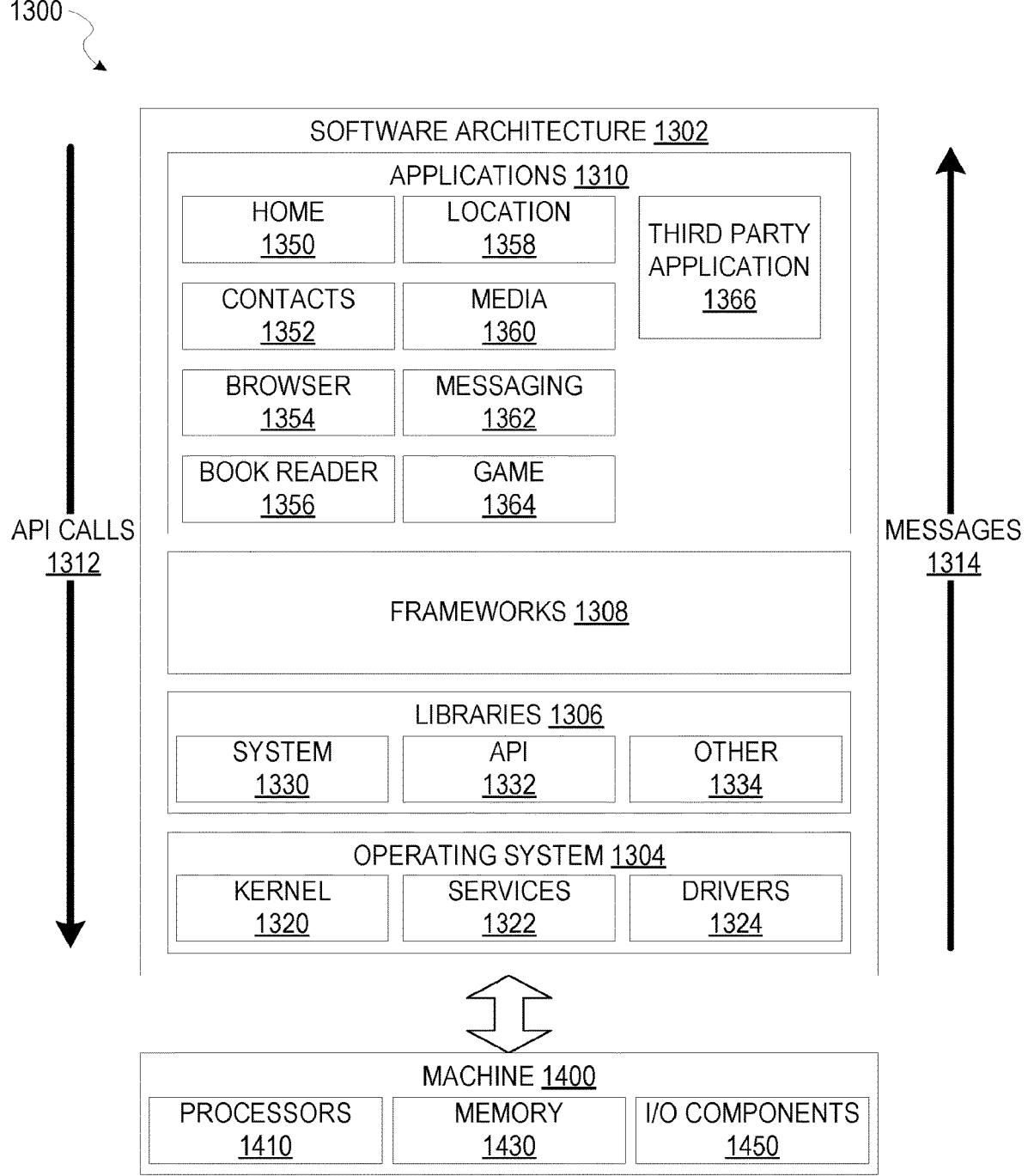
FIG. 13 is a block diagram illustrating an example of a software architecture that may be installed on a machine, according to some example embodiments.

FIG. 13 is a block diagram 1300 illustrating an architecture of software 1302, which may be installed on any one or more of the devices described above. FIG. 13 is merely a non-limiting example of a software architecture, and it will be appreciated that many other architectures may be implemented to facilitate the functionality described herein. The software architecture 1302 may be implemented by hardware such as a machine 1400 of FIG. 14 that includes processors 1410, memory 1430, and I/O components 1450. In this example architecture, the software 1302 may be conceptualized as a stack of layers where each layer may provide a particular functionality. For example, the software 1302 includes layers such as an operating system 1304, libraries 1306, frameworks 1308, and applications 1310. Operationally, the applications 1310 invoke application programming interface (API) calls 1312 through the software stack and receive messages 1314 in response to the API calls 1312, according to some implementations.

In various implementations, the operating system 1304 manages hardware resources and provides common services. The operating system 1304 includes, for example, a kernel 1320, services 1322, and drivers 1324. The kernel 1320 acts as an abstraction layer between the hardware and the other software layers in some implementations. For example, the kernel 1320 provides memory management, processor management (e.g., scheduling), component management, networking, and security settings, among other functionality. The services 1322 may provide other common services for the other software layers. The drivers 1324 may be responsible for controlling or interfacing with the underlying hardware. For instance, the drivers 1324 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 1306 provide a low-level common infrastructure that may be utilized by the applications 1310. The libraries 1306 may include system libraries 1330 (e.g., C standard library) that may provide functions such as memory allocation functions, string manipulation functions, mathematic functions, and the like. In addition, the libraries 1306 may include API libraries 1332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1306 may also include a wide variety of other libraries 1334 to provide many other APIs to the applications 1310.

The frameworks 1308 provide a high-level common infrastructure that may be utilized by the applications 1310, according to some implementations. For example, the frameworks 1308 provide various graphic user interface (GUI) functions, high-level resource management, high-level location services, and so forth. The frameworks 1308 may provide a broad spectrum of other APIs that may be utilized by the applications 1310, some of which may be specific to a particular operating system or platform.

In an example embodiment, the applications 1310 include a home application 1350, a contacts application 1352, a browser application 1354, a book reader application 1356, a location application 1358, a media application 1360, a messaging application 1362, a game application 1364, and a broad assortment of other applications such as a third party application 1366. According to some embodiments, the applications 1310 are programs that execute functions defined in the programs. Various programming languages may be employed to create one or more of the applications 1310, structured in a variety of manners, such as object-orientated programming languages (e.g., Objective-C, Java, or C++) or procedural programming languages (e.g., C or assembly language). In a specific example, the third party application 1366 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1366 may invoke the API calls 1312 provided by the mobile operating system 1304 to facilitate functionality described herein.

Example Machine Architecture and Machine-Readable Medium

Figure 14:
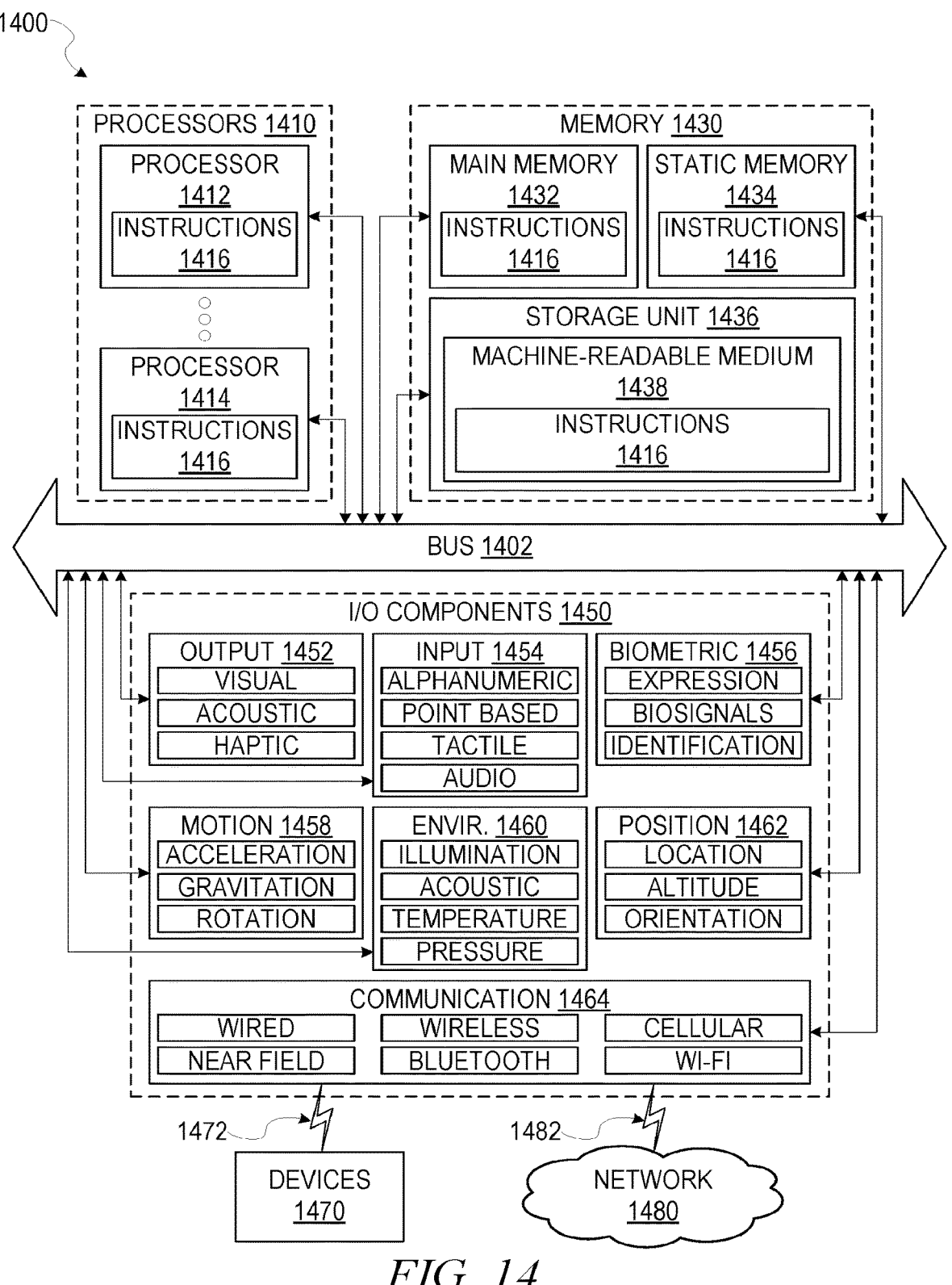
FIG. 14 is a diagrammatic representation of a machine in the form of a computer system within which a set of instructions may be executed for causing the machine to perform any one or more of the methodologies discussed herein, according to an example embodiment.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory 1430, and I/O components 1450, which may be configured to communicate with each other via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1412 and a processor 1414 that may execute the instructions 1416. The term "processor" is intended to include multi-core processors that may comprise two or more independent processors (also referred to as "cores") that may execute instructions contemporaneously. Although FIG. 14 shows multiple processors, the machine 1400 may include a single processor with a single core, a single processor with multiple cores (e.g., a multi-core processor), multiple processors with a single core, multiple processors with multiple cores, or any combination thereof.

The memory 1430 may include a main memory 1432, a static memory 1434, and a storage unit 1436 accessible to the processors 1410 via the bus 1402. The storage unit 1436 may include a machine-readable medium 1438 on which are stored the instructions 1416 embodying any one or more of the methodologies or functions described herein. The instructions 1416 may also reside, completely or at least partially, within the main memory 1432, within the static memory 1434, within at least one of the processors 1410 (e.g., within the processor's cache memory), or any suitable combination thereof, during execution thereof by the machine 1400. Accordingly, in various implementations, the main memory 1432, the static memory 1434, and the processors 1410 are considered machine-readable media 1438.

As used herein, the term "memory" refers to a machine-readable medium 1438 able to store data temporarily or permanently and may be taken to include, but not be limited to, random-access memory (RAM), read-only memory (ROM), buffer memory, flash memory, and cache memory. While the machine-readable medium 1438 is shown in an example embodiment to be a single medium, the term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine (e.g., processors 1410), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1450 include a wide variety of components to receive input, provide output, produce output, transmit information, exchange information, capture measurements, and so on. In general, it will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 include output components 1452 and input components 1454. The output components 1452 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1454 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1450 include biometric components 1456, motion components 1458, environmental components 1460, or position components 1462, among a wide array of other components. For example, the biometric components 1456 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 include acceleration sensor components (e.g., accelerometer), gravitation sensor components, rotation sensor components (e.g., gyroscope), and so forth. The environmental components 1460 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1462 include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 include a network interface component or another suitable device to interface with the network 1480. In further examples, the communication components 1464 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, in some implementations, the communication components 1464 detect identifiers or include components operable to detect identifiers. For example, the communication components 1464 include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 1464, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1480 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1416 are transmitted or received over the network 1480 using a transmission medium via a network interface device (e.g., a network interface component included in the communication components 1464) and utilizing any one of a number of well-known transfer protocols (e.g., Hypertext Transfer Protocol (HTTP)). Similarly, in other example embodiments, the instructions 1416 are transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Furthermore, the machine-readable medium 1438 is non-transitory (in other words, not having any transitory signals) in that it does not embody a propagating signal. However, labeling the machine-readable medium 1438 as "non-transitory" should not be construed to mean that the medium is incapable of movement; the medium should be considered as being transportable from one physical location to another. Additionally, since the machine-readable medium 1438 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

receiving, from a client device via a network, an image of a document comprising text;

identifying one or more curved lines in the image;

applying a dewarping function to the image based on the one or more curved lines in the image, the dewarping function comprising a transformation that straightens the one or more curved lines in the image;

performing image analysis on the dewarped image;

based on the image analysis, identifying a known document, from a database of a plurality of known documents, that best matches the dewarped image of the document;

using the known document as a template, identifying a location within the dewarped image that contains particular text by mapping regions of the dewarped image to document-specific fields within the known document;

performing optical character recognition within the identified location to extract the particular text; and causing presentation of the extracted particular text.

2. The method of claim 1, further comprising:

identifying a color of a line segment depicted in the image, wherein the optical character recognition is performed on portions of the image depicting the particular text while ignoring elements within the portions having the color of the line segment.

3. The method of claim 1, wherein performing the image analysis comprises identifying spacing of lines of text in the image.

4. The method of claim 3, wherein:

identifying the spacing of lines of text comprises virtually superimposing grids of lines over the text with different positions and spacings; and a position and spacing of a grid that overlaps the least with identified locations of text is used as a basis for text alignment.

5. The method of claim 3, wherein performing the image analysis further comprises identifying page edges in the image.

6. The method of claim 5, further comprising:

identifying portions of the dewarped image that depict text based on the identified page edges and the identified spacing of lines.

7. The method of claim 1, wherein identifying the known document comprises matching based on one or more of an aspect ratio, a number of lines, a line spacing to page height ratio, or a watermark.

8. The method of claim 1, further comprising:

accessing, from a second database, additional information regarding an item based on the extracted particular text; and generating a listing for the item by including at least some of the additional information accessed from the second database.

9. A system comprising:

one or more processors; and a memory storing instructions which, when executed by the one or more processors, cause the system to perform operations comprising:

receiving, from a client device via a network, an image of a document comprising text;

identifying one or more curved lines in the image;

applying a dewarping function to the image based on the one or more curved lines in the image, the dewarping function comprising a transformation that straightens the one or more curved lines in the image;

performing image analysis on the dewarped image;

based on the image analysis, identifying a known document, from a database of a plurality of known documents, that best matches the dewarped image of the document;

using the known document as a template, identifying a location within the dewarped image that contains particular text by mapping regions of the dewarped image to document-specific fields within the known document;

performing optical character recognition within the identified location to extract the particular text; and causing presentation of the extracted particular text.

10. The system of claim 9, wherein the operations further comprise:

identifying a color of a line segment depicted in the image, wherein the optical character recognition is performed on portions of the image depicting the particular text while ignoring elements within the portions having the color of the line segment.

11. The system of claim 9, wherein performing the image analysis comprises identifying spacing of lines of text in the image.

12. The system of claim 11, wherein:

the identifying the spacing of lines of text comprises virtually superimposing grids of lines over the text with different positions and spacings; and a position and spacing of a grid that overlaps the least with identified locations of text is used as a basis for text alignment.

13. The system of claim 11, wherein performing the image analysis further comprises identifying page edges in the image.

14. The system of claim 13, wherein the operations further comprise identifying portions of the dewarped image that depict text based on the identified page edges and the identified spacing of lines.

15. The system of claim 9, wherein identifying the known document comprises matching based on one or more of an aspect ratio, a number of lines, a line spacing to page height ratio, or a watermark.

16. The system of claim 9, wherein the operations further comprise:

accessing, from a second database, additional information regarding an item based on the extracted particular text; and generating a listing for the item by including at least some of the additional information accessed from the second database.

17. A non-transitory computer-readable medium storing executable instructions which, when executed by one or more processors of a server, cause the server to perform operations comprising:

receiving, from a client device via a network, an image of a document comprising text;

identifying one or more curved lines in the image;

applying a dewarping function to the image based on the one or more curved lines in the image, the dewarping function comprising a transformation that straightens the one or more curved lines in the image;

performing image analysis on the dewarped image;

based on the image analysis, identifying a known document, from a database of a plurality of known documents, that best matches the dewarped image of the document;

using the known document as a template, identifying a location within the dewarped image that contains particular text by mapping regions of the dewarped image to document-specific fields within the known document;

performing optical character recognition within the identified location; and causing presentation of the extracted particular text.

18. The computer-readable medium of claim 17, wherein the operations further comprise:

identifying a color of a line segment depicted in the image, wherein the optical character recognition is performed on portions of the image depicting the particular text while ignoring elements within the portions having the color of the line segment.

19. The computer-readable medium of claim 17, wherein identifying the known document comprises matching based on one or more of an aspect ratio, a number of lines, a line spacing to page height ratio, or a watermark.

20. The computer-readable medium of claim 17, wherein the operations further comprise:

accessing, from a second database, additional information regarding an item based on the extracted particular text; and generating a listing for the item by including at least some of the additional information accessed from the second database.

\* \* \* \* \*